Feb. 6, 1968     T. E. JENKINS     3,367,687

MEANS TO SECURE AN ELEMENT TO A SHAFT

Filed Jan. 27, 1966

INVENTOR.
THOMAS E. JENKINS
BY James E. Espe
HIS ATTORNEY

United States Patent Office 3,367,687
Patented Feb. 6, 1968

3,367,687
MEANS TO SECURE AN ELEMENT TO A SHAFT
Thomas E. Jenkins, Louisville, Ky., assignor to General Electric Company, a corporation of New York
Filed Jan. 27, 1966, Ser. No. 523,362
6 Claims. (Cl. 287—52.06)

ABSTRACT OF THE DISCLOSURE

Improved means for securing an element, such as a fan or the like, having an opening therethrough to a shaft. The securing means basically includes a collet and a sleeve. The collet has a bore adapted to be readily slipped over the shaft. One end portion of the collet is axially slotted and extends to an annular shoulder on the collet outer wall. The relaxed external diameter of the slotted collet end portion is small enough to fit into the element opening. The sleeve has an internal diameter less than the relaxed external diameter of the slotted collet end portion and is adapted to be slipped tightly thereover to crimp the collet firmly to the shaft. A flange on the sleeve firmly secures the element against the collet shoulder, whereby the collet and the element are firmly secured to the shaft.

---

This invention relates generally to means to secure an element to a shaft and finds particular usefulness in securing a fan or blower to a rotatable shaft.

Of course, many means have been proposed heretofore to secure an element to a shaft and most have been successful, at least to the extent of the limited application for which each was designed. However, most arrangements for securing an element such as, for example, a fan or blower to a rotatable shaft are concerned exclusively with providing a rigid connection between the element and the shaft and, in providing such rigid connection, consideration such as distortion of the shaft, vibration damping and accurate location of the element along the shaft axis are either ignored completely or partially sacrificed since to provide all of the foregoing benefits, arrangements known heretofore became prohibitively expensive. It would be advantageous to provide a means to secure an element to a shaft which, in addition to achieving suitable firmness of connection, minimizes shaft distortion, achieves vibration damping and accurately locates the element along the shaft axis.

Accordingly, it is an object of the present invention to provide an improved means to secure an element to a shaft.

It is another object of the present invention to provide means to secure an element to a shaft which achieves firmness of connection while minimizing shaft distortion during and following assembly.

It is another object of the present invention to provide means to secure an element to a shaft which achieves firmness of connection and vibration damping.

It is a further object of the present invention to provide means to secure an element to a shaft which accurately locates the element along the shaft axis.

Briefly stated, in accordance with one aspect of the present invention, means are provided to secure an element having an opening therethrough to a shaft and comprise a collet having an internal diameter of sufficient size to readily slip over the shaft and an external diameter for at least a portion of its length at one of its ends sufficiently small to readily fit into the opening in the element. Means are provided on the external surface of the collet at a point axially spaced from the one end and are adapted to engage the element. At least one substantially longitudinal slot is provided in the collet and extends from the one end of the collet at least part of the distance to the aforementioned means on the collet external surface. A sleeve having an internal diameter less than the relaxed external diameter of the slotted collet end portion and adapted to be slipped tightly thereover is provided with an outwardly extending flange on one end which is adapted to engage the element and clamp it to the means on the collet external surface when the sleeve is slipped over the aforementioned one end of the collet. The sleeve is adapted to compress the collet into firm engagement with the shaft whereby the sleeve, collet, element and shaft are all firmly secured together.

While the specification concludes with claims particularly pointing out and distinctly claiming the subject matter which is regarded as the invention, it is believed the invention will be better understood from the following description taken in connection with the accompanying drawings, in which:

Figure 1:
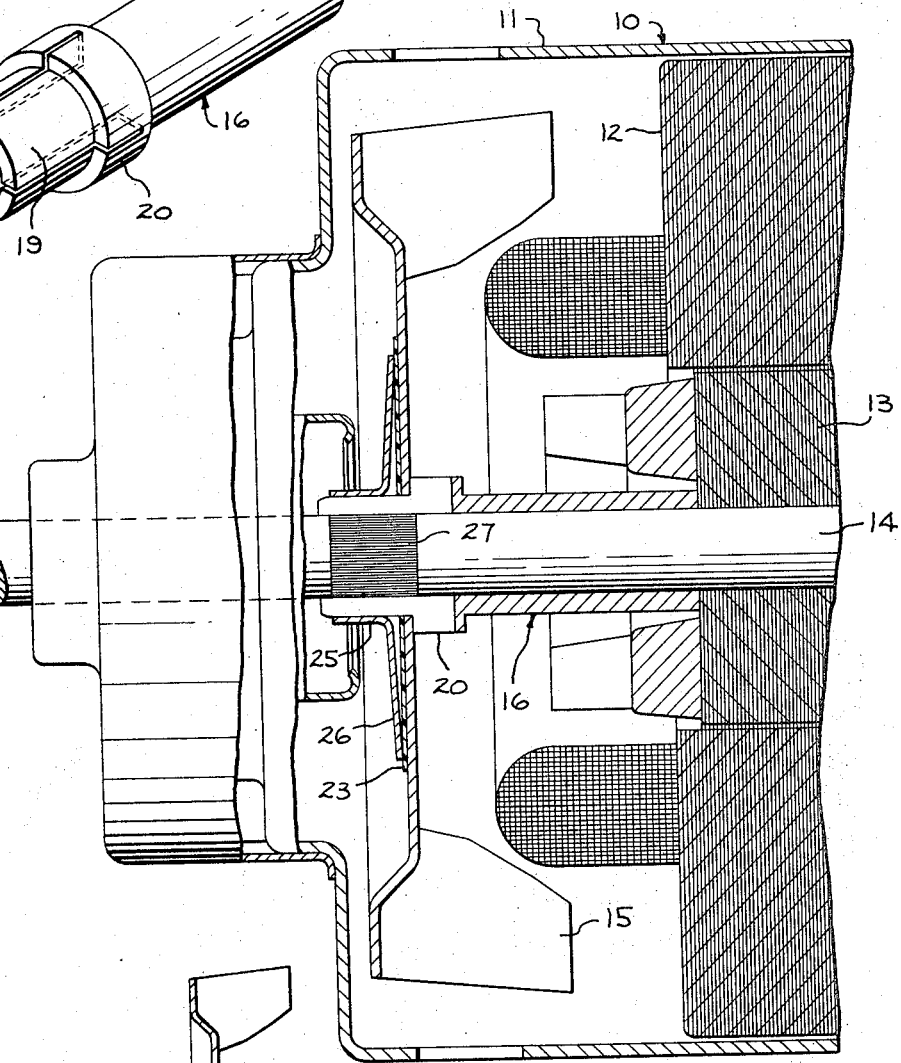
FIGURE 1 is a fragmentary sectional view of an electric motor employing the present invention to secure a cooling fan to the motor shaft.
Figure 3:
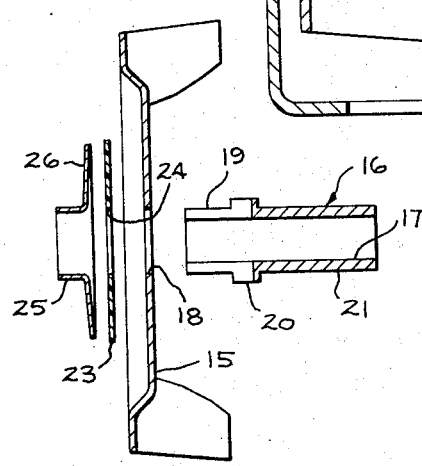
FIGURE 3 is an exploded view of elements comprising the present invention.

Referring now to the drawing, and particularly to FIGURE 1 thereof, there is illustrated an electric motor 10 having an outer casing 11. Suitably supported within casing 11 is a stator 12 having a central opening which receives a rotatable armature 13. Armature 13 is secured to, and supported by, a rotatable shaft 14. It will be obvious that the structure thus far described may be conventional in every respect and may vary somewhat from the specific configuration illustrated in FIGURE 1 without affecting the present invention.

It is also conventional to provide a cooling fan or blower such as fan 15 within casing 11 to rotate with shaft 14 to circulate a cooling medium within casing 11 to prevent over-heating of the motor. Various means have been proposed heretofore to secure such a fan to a motor shaft. These means have included, for example, forming the fan integrally with either shaft 14 or armature 13. Also, it has been conventional to press fit the fan directly onto shaft 14. Other arrangements have been proposed and, as indicated above, these have been successful at least to the extent of the limited application for which each was designed. However, many of these resulted in shaft distortion, failed to provide vibration damping or did not accurately locate the fan, or other element being mounted, along the shaft axis.

In accordance with the present invention, means are provided to secure fan 15, or any other similar element, to shaft 14 and the means minimizes shaft distortion, provides vibration damping and accurately locates the fan along the axis of shaft 14.

Figure 2:
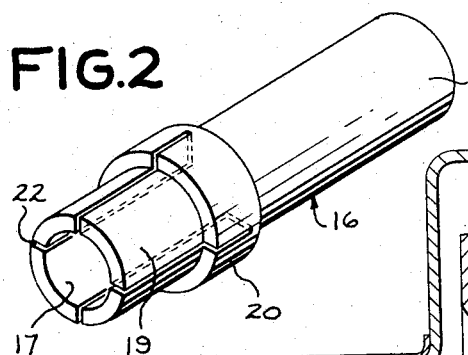
FIGURE 2 is a perspective view of the collet of the present invention.

The present invention includes a collet 16 having a central bore 17 therethrough of sufficient size to readily slip over shaft 14. Fan 15 has an opening 18 therethrough and collet 16 has a portion 19 with an external diameter sufficiently small to readily fit into opening 18. Portion 19 of collet 16 extends from one end of collet 16 to an annular shoulder 20, or other suitable means to serve the function hereinafter described. Collet 16 has a second portion 21 which extends from shoulder 20 to the other end of collet 16 and, as will become more evident hereinafter, the outside diameter of portion 21 need not be the same size as the outside diameter of portion 19. Portion 19 of collet 16 has at least one substantially longitudinal slot 22 and preferably is provided with four equally spaced slots as shown in FIGURE 2.

In assembling the aforedescribed means, collet 16 is slipped over shaft 14 until the terminal end of portion 21 engages armature 13 as shown in FIGURE 1. Fan 15 is then slipped onto collet 16 by inserting portion 19 through opening 18 until fan 15 engages annular shoulder 20. In the preferred form of the present invention, a washer 23, made from cardboard fiber and having a central opening 24, is assembled onto collet 16 with portion 19 entering opening 24. A sleeve 25 having an outwardly extending flange 26 is then slipped over portion 19 of collet 16 until it engages washer 23 as shown in FIGURE 1.

Sleeve 25 has an internal diameter slightly less than the outside diameter of portion 19 so that, as sleeve 25 is assembled onto portion 19, portion 19 is compressed into firm engagement with shaft 14. The firm engagement thus established causes collet 16 to rotate with shaft 14. Although it has been found in practice that the foregoing arrangement will provide sufficiently firm engagement between collet 16 and shaft 14 when shaft 14 is smooth, the engagement may be enhanced by knurling shaft 14 as shown at 27 in FIGURE 1. With a shaft diameter in the magnitude of approximately 5/16 inch it has been found that an interference of approximately .030 inch between the ouside diameter of portion 19 and the internal diameter of sleeve 25 is sufficient to provide suitable engagement between collet 16 and shaft 14.

In the preferred embodiment of the present invention, flange 26 is given a slight conical configuration so that it engages washer 23 at the periphery of flange 26 and exerts a spring force against fan 15 through washer 23 in a manner similar to that of a Belleville spring.

The foregoing arrangement minimizes bending or distortion of shaft 14, even when shaft 14 is of a diameter in the magnitude of .30 inch, since the shaft is subjected only to a radial gripping force. Moreover, sleeve 25 with its conical flange 26 exerts a spring load on fan 15 which adsorbs vibrations generated by the fan blades striking air within casing 11. Collet 16 accurately locates fan 15 relative to armature 13 since portion 21 is adapted to abut armature 13. This, of course, locates fan 15 along the axis of shaft 14. The spring force exerted by flange 26 against fan 15 as well as the effective spring force exerted by sleeve 25 through portion 19 to shaft 14, minimizes any loosening which might otherwise occur if the fan were rigidly connected to shaft 14 and then subjected to a shock such as might occur if the assembly were dropped. Additionally, the foregoing arrangement provides a fast and inexpensive assembly technique and does not depend on a close tolerance interference fit between the fan and the shaft. The last mentioned characteristic of the present invention is a result of designing the sleeve and portion 19 of collet 16 so that the sleeve 25 is in yield condition when assembled onto portion 19. Washer 23 enhances vibration damping by absorbing vibration forces and further provides improved frictional engagement between flange 26 and fan 15. It is to be understood that the present invention is applicable to mounting elements other than a fan to a shaft.

As will be evident from the foregoing description, certain aspects of the invention are not limited to the particular details of construction of the example illustrated, and it is contemplated that various modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. Means to secure an element having an opening therethrough to a shaft comprising:
    (a) a collet having a central bore of sufficient size to readily slip over the shaft and an external diameter for at least a portion of its length at one of its ends sufficiently small to readily to fit into the opening in the element,
    (b) means axially spaced from said one end on the external surface of said collet adapted to engage the element,
    (c) at least one substantially longitudinal slot in said collet extending from said one end of said collet at least part of the distance to said means on its external surface,
    (d) a sleeve having an internal diameter less than said external diameter of said portion of said collet and adapted to be slipped tightly thereover, and
    (e) an outwardly extending flange on one end of said sleeve adapted to engage the element and clamp it to said means on said collet external surface when said sleeve is slipped over said portion of said collet,
    (f) said sleeve being adapted to compress said portion of said collet into firm engagement with the shaft whereby said sleeve, said collet, the element and the shaft are all firmly secured together.

2. The invention of claim 1 wherein said outwardly extending flange is generally conical whereby the outer periphery of said flange engages the element and applies a spring force thereto.

3. The invention of claim 1 further comprising a fiber washer disposed between said flange and the element.

4. The invention of claim 1 wherein said means on said collet external surface comprises an annular shoulder.

5. Means to position and secure a first element, such as a fan or the like, having an opening therethrough on a shaft carrying a second element, comprising:
    (a) a collet having a central bore of sufficient size to readily slip over the shaft and an external diameter for at least a portion of its length at one of its ends sufficiently small to fit readily into the opening in the element,
    (b) means axially spaced from said one end on the external surface of said collet adapted to engage the first element,
    (c) the other end of said collet extending axially beyond said means on said collet external surface a predetermined distance to abut the second element and position the first element with respect to the second element,
    (d) at least one substantially longitudinal slot in said portion of said collet extending from said one end at least part of the distance to said means on said collet external surface,
    (e) a sleeve having an internal diameter less than said external diameter of said portion of said collet and adapted to be slipped tightly thereover, and
    (f) an outwardly extending flange on one end of said sleeve adapted to engage the first element and clamp it to said means on said external surface when said sleeve is slipped over said collet portion,
    (g) said sleeve being adapted to compress said collet portion into firm engagement with the shaft, whereby said sleeve, said collet, the first element, and the shaft are all firmly secured together with the first element positioned at a predetermined distance from the second element.

6. The invention of claim 5 wherein said means on said collet external surface comprises an annular shoulder.

References Cited

UNITED STATES PATENTS

| | | | |
|---|---|---|---|
| 2,787,483 | 4/1957 | Harvey et al. | 287—52.06 |
| 3,061,869 | 11/1962 | Scalo et al. | |
| 3,146,007 | 8/1964 | Boive et al. | 287—53 |
| 3,264,016 | 8/1966 | Reisch | 287—53 |

CARL W. TOMLIN, *Primary Examiner.*

WAYNE L. SHEDD, *Assistant Examiner.*